(12) United States Patent
Leurck et al.

(10) Patent No.: US 10,358,074 B2
(45) Date of Patent: Jul. 23, 2019

(54) TAILGATE LIFT APPARATUS AND METHOD

(71) Applicants: James B. Leurck, Traverse City, MI (US); Eugene G. Cousineau, Fort Garland, CO (US)

(72) Inventors: James B. Leurck, Traverse City, MI (US); Eugene G. Cousineau, Fort Garland, CO (US)

( * ) Notice: Subject to any disclaimer, the term of this patent is extended or adjusted under 35 U.S.C. 154(b) by 0 days.

(21) Appl. No.: 15/596,356

(22) Filed: May 16, 2017

(65) Prior Publication Data

US 2017/0327023 A1 Nov. 16, 2017

Related U.S. Application Data

(63) Continuation-in-part of application No. 14/293,862, filed on Jun. 2, 2014, now Pat. No. 9,649,969.

(60) Provisional application No. 61/830,112, filed on Jun. 2, 2013.

(51) Int. Cl.
*B60P 1/44* (2006.01)
*B65G 67/04* (2006.01)
*B65G 67/24* (2006.01)
*B60P 1/02* (2006.01)
*H02G 1/00* (2006.01)
*B60P 1/00* (2006.01)

(52) U.S. Cl.
CPC ............. *B60P 1/4421* (2013.01); *B60P 1/003* (2013.01); *B60P 1/022* (2013.01); *B65G 67/04* (2013.01); *B65G 67/24* (2013.01); *H02G 1/00* (2013.01); *B65G 2814/0313* (2013.01)

(58) Field of Classification Search
CPC .......... B60P 1/4485; B60P 1/44; B60P 1/4414; B60P 1/4421; B60P 1/022
See application file for complete search history.

(56) References Cited

U.S. PATENT DOCUMENTS

| | | | | |
|---|---|---|---|---|
| 2,908,408 A | * | 10/1959 | Reed, Jr. ............... | B60P 1/4421 187/267 |
| 3,024,926 A | * | 3/1962 | Nolden ................. | B60P 1/4421 414/545 |
| 4,176,999 A | * | 12/1979 | Thorley ................ | B60P 1/4421 105/447 |
| 4,813,842 A | * | 3/1989 | Morton .................. | A01D 90/00 292/DIG. 29 |
| 5,513,943 A | * | 5/1996 | Lugash ................. | B60P 1/4421 187/244 |
| 5,641,262 A | * | 6/1997 | Dunlop ................. | B60P 1/4414 254/10 R |

(Continued)

*Primary Examiner* — Mark C Hageman
(74) *Attorney, Agent, or Firm* — Rick B. Yeager

(57) ABSTRACT

A pickup truck tailgate lift apparatus attachable with no body modification, to create a powered lift function utilizing the tailgate as a load platform. Two side assemblies, which extend a lift mechanism beyond the rear bumper, are mounted over the existing tailgate pivot and upper cable anchor pin so that the tailgate may be opened and closed with respect to the side assemblies in the same manner that it is opened and closed with respect to the cargo box. The vehicle tailgate is attached to an electric drive plate assembly so that the tailgate, and a load place on the tailgate, is raised or lowered as the drive plate assembly is raised and lowered. In one embodiment, an electric motor is placed on each side to drive a treaded rod to move a drive plate up or down.

10 Claims, 23 Drawing Sheets

(56) References Cited

U.S. PATENT DOCUMENTS

| | | | | |
|---|---|---|---|---|
| 6,746,066 | B2* | 6/2004 | Reed | B62D 33/0273 |
| | | | | 296/26.08 |
| 6,976,820 | B2* | 12/2005 | Sandy | B60P 1/4414 |
| | | | | 296/62 |
| 7,175,060 | B1* | 2/2007 | Carpenter | B60P 1/003 |
| | | | | 224/281 |
| 8,132,997 | B2* | 3/2012 | Reuille | B60P 1/4421 |
| | | | | 224/537 |
| 9,028,195 | B1* | 5/2015 | Heynssens | B60P 1/4428 |
| | | | | 414/545 |
| 2008/0159839 | A1* | 7/2008 | Gomes | B60P 1/4421 |
| | | | | 414/545 |
| 2008/0211254 | A1* | 9/2008 | Maier | B60P 1/4414 |
| | | | | 296/57.1 |
| 2015/0071749 | A1* | 3/2015 | Hambardzumyan | ......... |
| | | | | B60P 1/4485 |
| | | | | 414/540 |

\* cited by examiner

| 4 | 3 | EL-2677 | SCREW M8 |

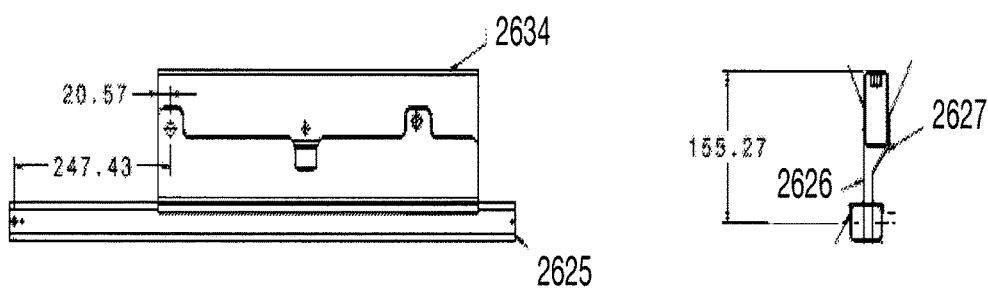
FIG. 11A
FIG. 11B
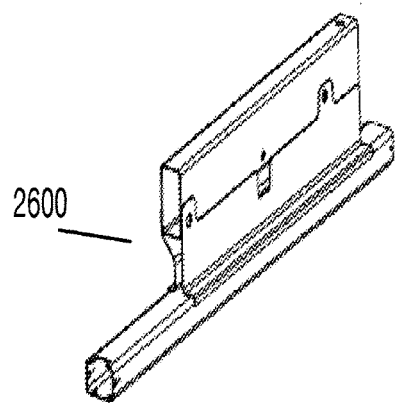
FIG. 11C

Isometric view
Scale: 1:2
RH SHOWN

| 2 | EL-2636 | NUT WELD - M10 X 1.5 |
| 1 | EL-2635 | TUBE REAR REINF |

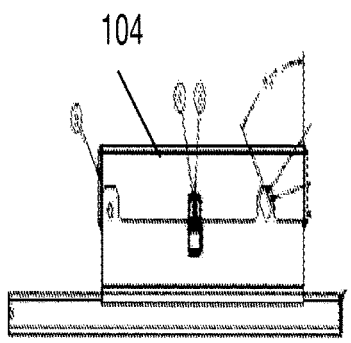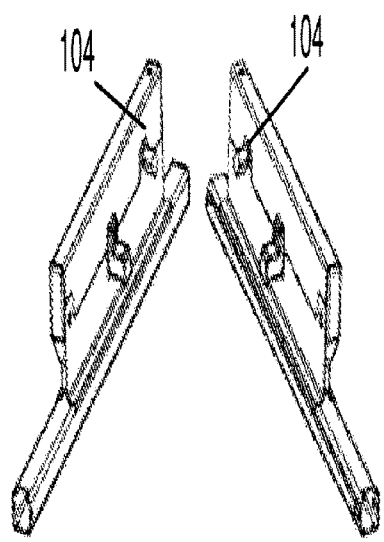
FIG. 13A   FIG. 13B   FIG. 13C

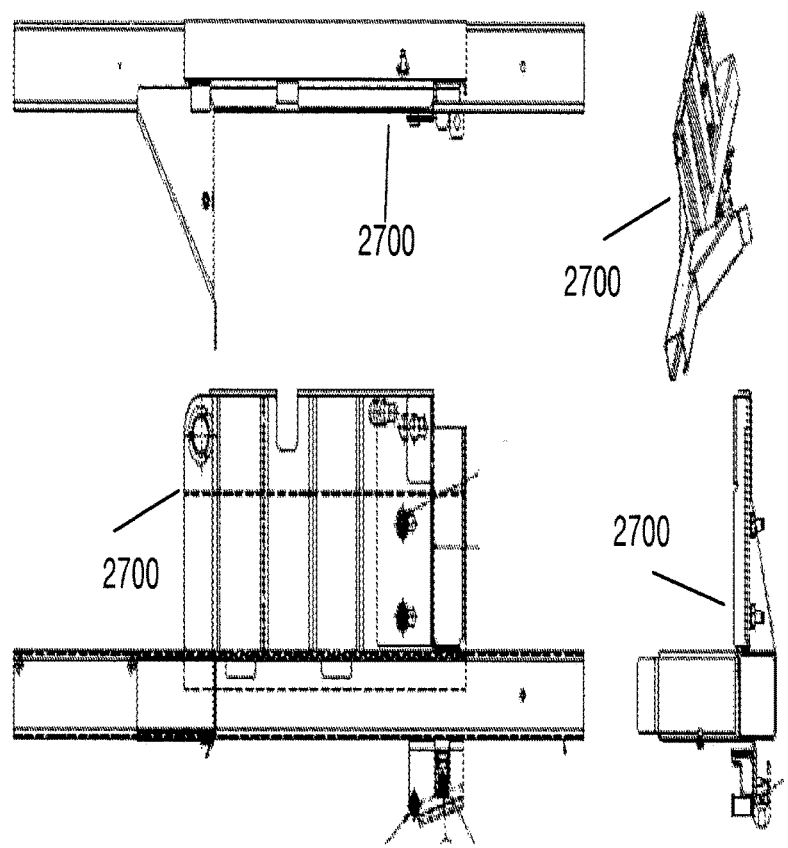

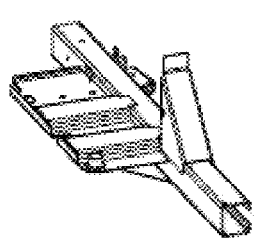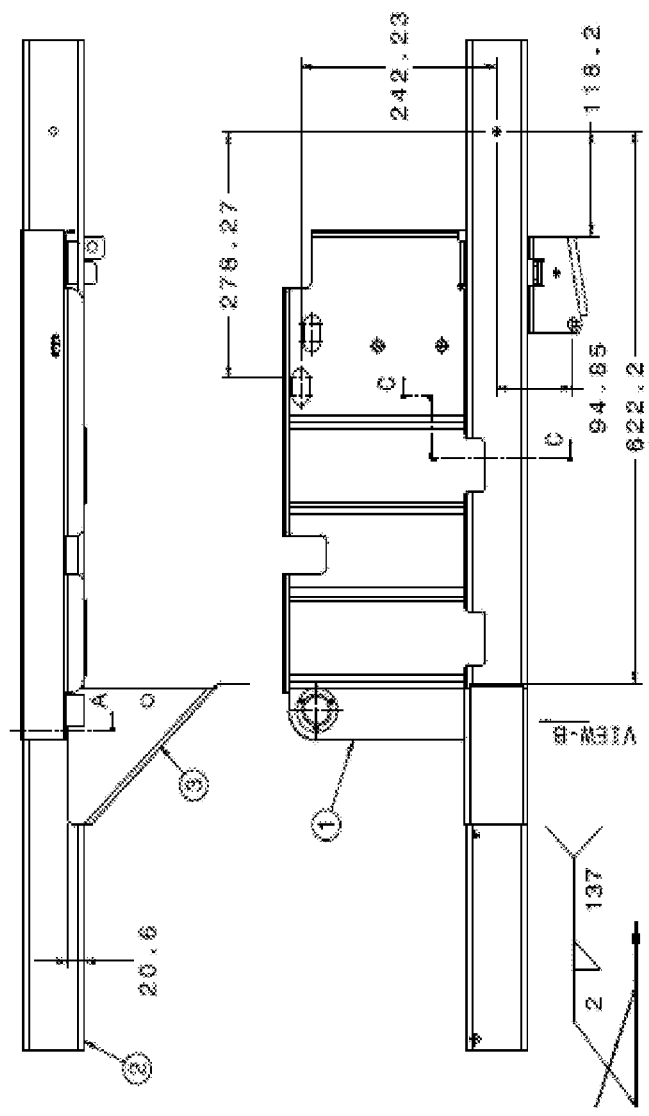

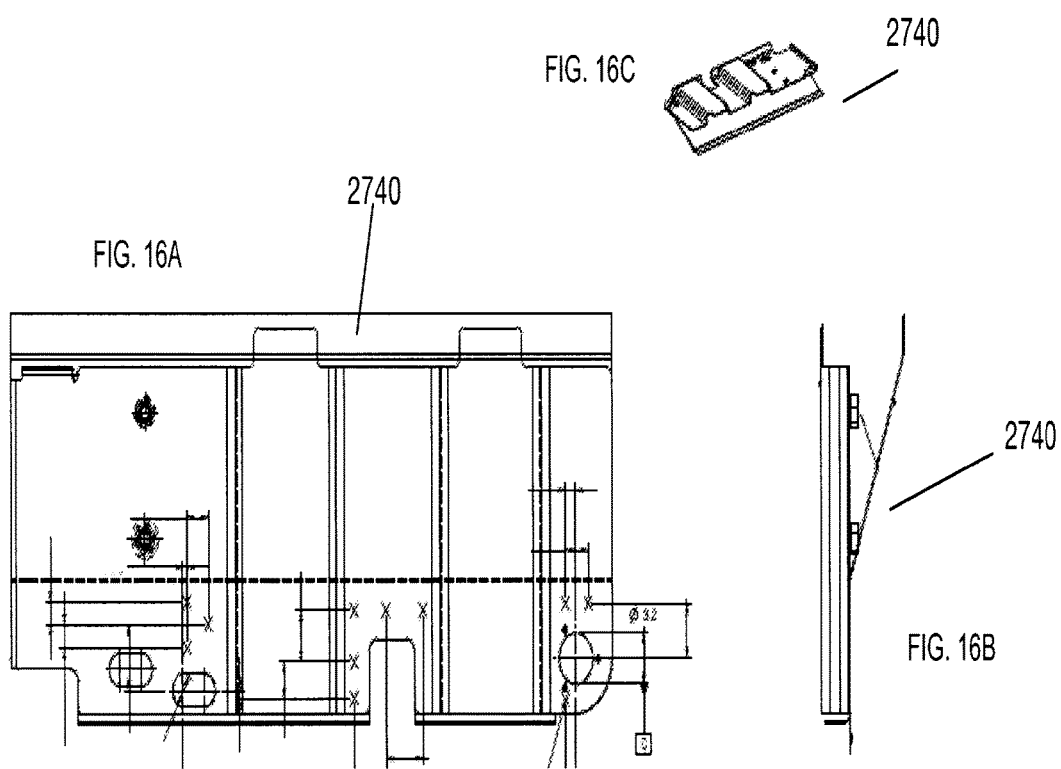

TAILGATE LIFT APPARATUS AND METHOD

This US non-provisional patent application is a continuation-in-part of U.S. patent application Ser. No. 14/293,862 filed Jun. 2, 2014 which is related to U.S. Provisional Patent Application No. 61/830,112 filed Jun. 2, 2013, and claims the benefit of that provisional application filing date.

BACKGROUND

Field of Invention

The current invention relates to an apparatus and method for a truck tailgate lift apparatus.

Prior Art

The prior art includes various hydraulic, pneumatic, and motor-driven lift devices. U.S. Pat. No. 3,688,649 to Hostetler describes A hydraulically actuated lift unit wherein a vertical hydraulic cylinder is mounted for guided vertical movement relative to fixed supporting structure, the piston rod associated with the cylinder extending downwardly there from and resting upon the support structure. Means is provided for guiding vertical movement of an elongated lift column, the latter having horizontally extending load carrying means at its lower end. A pulley is mounted on the exterior of the cylinder for rotation about a horizontal axis, and a cable is entrained over the pulley and has depending ends secured to the column and the fixed supporting structure whereby vertical movement of the column is twice that of the cylinder. The relatively fixed piston rod has a passageway there through whereby hydraulic fluid can be introduced into the cylinder to force upward movement of the latter. A pair of such units can be mounted on a truck bed with the load carrying means being common to both units and pivotally mounted thereon to serve as an end gate.

U.S. Pat. No. 4,813,842 to Morton describes a tailgate apparatus for a pick-up truck comprising a frame assembly adapted to be mounted around the preexisting bumper of a vehicle after removal of the conventional tail gate. The assembly does not require removal of the truck bumper and maintains the visibility of the license plate. Lifting and raising of the tail gate is provided by spool wound flexible straps on each side powered by a geared motor. A drive shaft under the platform interconnecting the side housings is driven by the motor rotating a first spool in one of the housings so that the spools rotate together. The apparatus is light weight and reliable in operation.

U.S. Pat. No. 6,164,895 to Croswell describes a lifting attachment is disclosed for use in conjunction with a trailer hitch mounted to a vehicle. The lifting attachment includes a support assembly which is detachably connected to the trailer hitch and this support assembly includes a vertically extending support beam. The attachment includes a platform having a generally planar top and an elongated arm having one end pivotally connected to the platform and a second end pivotally connected to the support beam. A hydraulic piston and cylinder assembly is pivotally connected between the support beam and an intermediate point on the arm so that extension and retraction of the piston within the cylinder selectively raises and lowers the platform.

U.S. Pat. No. 6,893,203 to Anderson describes a liftgate/tailgate assembly for a vehicle having a chassis and a cargo area, such cargo area comprising a bed and one or more vertical sidewalls mounted to the vehicle chassis, such liftgate/tailgate assembly comprising a tailgate which, when rotated into an open tailgate position, forms a liftgate/tailgate platform to support a load to be lifted, and one or more linkage assemblies pivotably mounted to the tailgate which permit the liftgate/tailgate platform to be translated both vertically and horizontally relative to the cargo area of the vehicle, while permitting rear impact protection to be mounted on the vehicle and method for lifting a load into a vehicle cargo area.

SUMMARY OF INVENTION

In one embodiment, an Electric Powered Lift Mechanism (EPLM) Assembly is attached to a pick-up truck box rear structure, with no body modification, to create a powered up-down lift function utilizing the box's tailgate as a load platform.

In one unique example, the EPLM concept provides for the use of the standard tailgate, in the unlatched horizontal position, to move up and down within one minute carrying a maximum load of 1000 pounds. A switch via the vehicle's electric system controls the movement.

In one embodiment, the unique truck box installation process provide for the quick and simple installation with no box structure rework for fixed attachment. The installation process is as follows:

Disconnect the two (2) tailgate cables from the cargo box and remove the tailgate. No tools are required.

Insert each Side Assembly's lower collar into the cargo box's tailgate pivot pins and pivot to the vertical position at the cargo box sticker pins. Secure the lock latch to the striker pins via two (2) via attached nuts each side (FIG. 1)

Install the Floor Pan and secure to the lower support bracket via two (2) screws one each side.

Attach the Lower Support Bar via two (2) bolts one each side.

Connect the right side Wire Harness Assembly to the lift side Wire Harness Assembly and secure to the Floor Pan lower clips.

Insert the total Wire Harness Assembly to the truck trailer electrical receptacle for the system's 12-Volt system.

Re-install the Tailgate to the Side Assemblies. Attach the cables on each side and check closed and open load positions.

This embodiment provides for a pick-up truck tailgate power up-down lift system via electrical/mechanical components comprising an electric motor, a set of gears and a bearing screw drive shaft enclosed in two (2) assembled tubular vertical pillars each side. One portion of each pillar assembly is affixed to the Cargo Box; and one moveable tube in each assembly is attached to the Tailgate to provide for a thirty (30) inch vertical travel. In this example, the power source is from the vehicle's electric 12-volt system. The Tailgate's up-down travel is packaged rearward of the Cargo Box structure to provide clearance to the vehicle's rear bumper. A Floor Pan extension is installed to eliminate the opening between the Tailgate and the Cargo Box floor pan.

BRIEF DESCRIPTION OF THE DRAWINGS

FIGS. 1-16 are subassembly drawings of one embodiment of the current invention as referenced in the element list below.

FIG. 1 is an exploded side perspective view of a right side inner/outer tube assembly; a left side inner/outer tube assembly; and a floor panel of a first embodiment of a tailgate lift device.

FIG. 2 is an electrical schematic of the tailgate lift device of FIG. 1.

FIG. 4 is an exploded side perspective view of a right side inner tube drive plate assembly of the tailgate lift device of FIG. 1.

FIG. 5 is an exploded view of a top portion of the main screw drive plate assembly of the tailgate lift device of FIG. 1.

FIG. 6 is an exploded view of a motor/plate/gear drive assembly of the tailgate lift device of FIG. 1.

FIG. 7 is an exploded view of the motor/plate/gear drive assembly of FIG. 6.

FIG. 8 is an exploded view of a thrust bearing assembly of the tailgate lift device of FIG. 1.

FIG. 9 is an exploded view of a plate and gear assembly of the tailgate lift device of FIG. 1.

FIG. 10 is side perspective view of an inner tube and drive plate assembly of the tailgate lift device of FIG. 1.

FIG. 11A is a side view of an inner tube and lift plate assembly of the tailgate lift device of FIG. 1.

FIG. 11B is a top view of the inner tube and lift plate assembly of the tailgate lift device of FIG. 11A.

FIG. 11C is an isometric view of the inner tube and lift plate assembly of the tailgate lift device of FIG. 11A.

FIG. 13A is a side view of the inner tube assembly of the tailgate lift device of FIG. 1.

FIG. 13B is a first isometric view of the inner tube assembly of the tailgate lift device of FIG. 13A.

FIG. 13C is a second isometric view of the inner tube assembly of the tailgate lift device of FIG. 13A.

FIG. 14A is a side view of the outer tube assembly of the tailgate lift device of FIG. 1.

FIG. 14B is a top view of the outer tube assembly of FIG. 14A.

FIG. 14C is a front view of the outer tube assembly of FIG. 14A.

FIG. 14D is an isometric view of the outer tube assembly of FIG. 14A.

FIG. 15A is a side view of the outer tube assembly and floor support bracket of the tailgate lift device of FIG. 1.

FIG. 15B is a top view of the outer tube assembly and floor support bracket of FIG. 15A.

FIG. 15C is a front view of the outer tube assembly and floor support bracket of FIG. 15A.

FIG. 15D is an isometric view of the outer tube assembly and floor support bracket of FIG. 15A.

FIG. 16A is a side view of the side panel assembly of the tailgate lift device of FIG. 1.

FIG. 16B is a top view of the side panel assembly of FIG. 16A.

FIG. 16C is an isometric view of the side panel assembly of FIG. 16A.

DESCRIPTION OF EMBODIMENT

Electric Powered Lift Mechanism (EPLM)

This embodiment provides an Electric Powered Lift Mechanism (EPLM).

Figure 8:
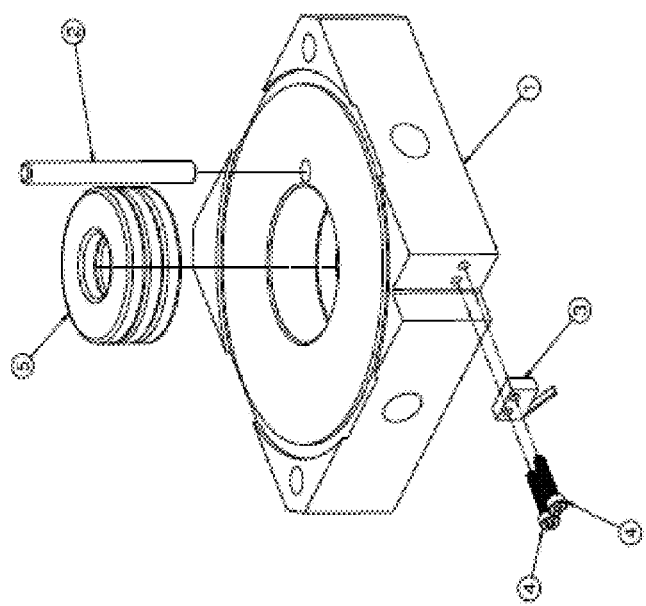
Figure 9:
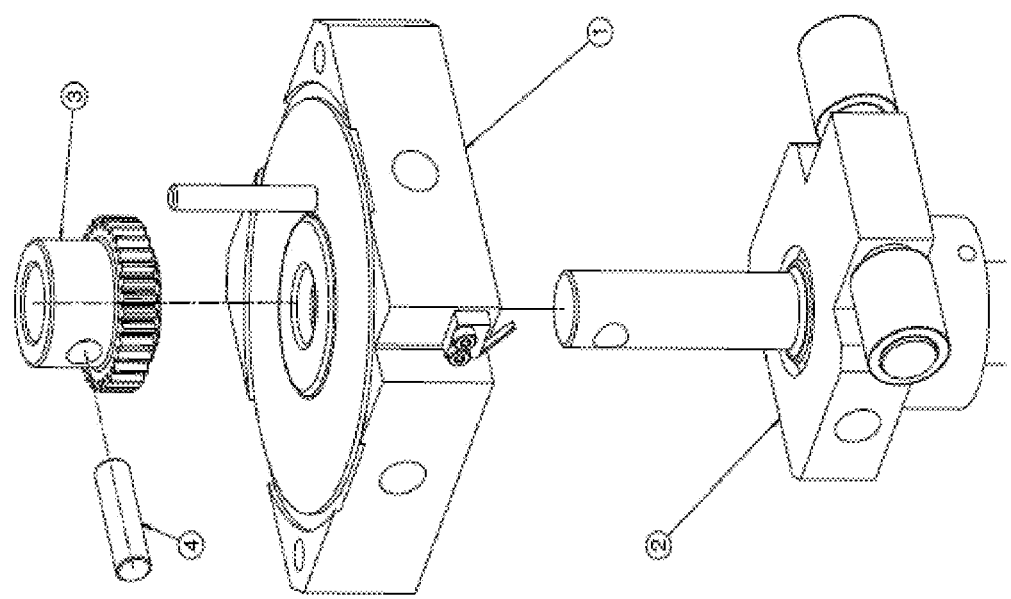
Figure 10:
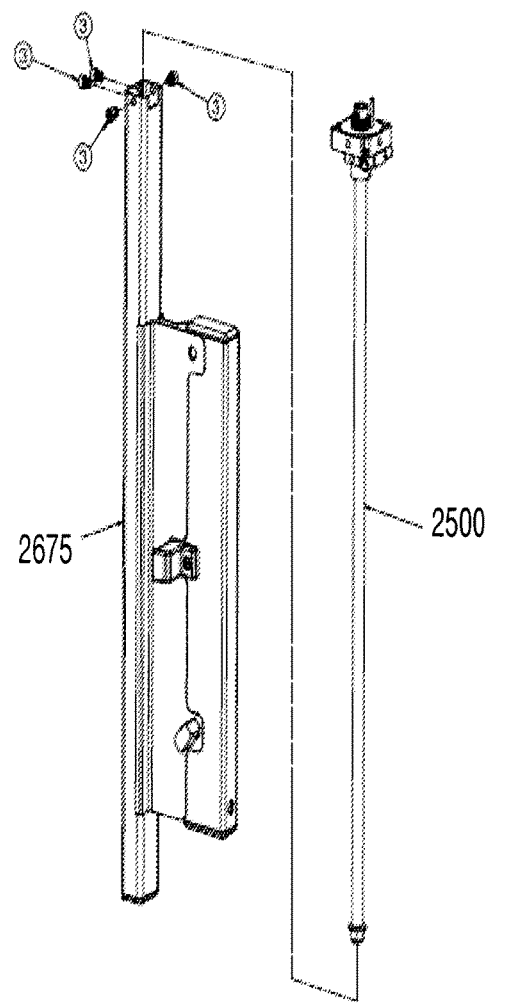

The following element numbers are referenced in the figures.
Pick-Up 60
rear bumper 70
tailgate 80
tailgate cable 81
cargo box 85
tailgate pivot 95
upper cable anchor pin 96
Electric Powered Lift Mechanism (EPLM) 100
side assembly pivot mounting notch 101
side assembly striker mounting slot 102
new tailgate pivot 104
new tailgate striker 105
1000 VEHICLE INSTALLATION-POWER LIFT—FIG. 1
2300 INNER/OUTER TUBE ASY (FINAL)
2300a right side INNER/OUTER TUBE ASY
2260 PANEL-FLOOR
2544 SCREW-FLOOR ATT.
2261 BRACE-LOWER SUPPORT
2262 SCREW-SUPPORT ATT.
2000 ELECTRICAL COMPONENT SCHEMATIC DIAGRAM—FIG. 2
2857 HARNESS ASY-LH
2858 PCU CONTROL UNIT
2859 SWITCH-TAILGATE UP-DOWN FUNCTION
2860 TAIL LIGHT-LED STOP/TURN/TAIL LIGHT
2861 SWITCH-TAILGATE HORIZONTAL LOAD POSITION
2272 PANEL ASY-SIDE COLLAR ATT.—FIG. 3
2733 PANEL ASY-SIDE (WELD)
2267 COLLAR-LOWER BODY
2801 RIVET-COLLAR ATT
2300 OUTER-INNER TUBE ASY (FINAL)—FIG. 4
2526 INNER TUBE/DRIVE PLATE ASY
2700 TUBE ASY-OUTER (FINAL)
2564 SCREW-GEAR/TUBE/PLATE ASY ATT.
2467 CAP-OUTER TUBE CLOSURE
2633 NYLON SHEET
2523 SCREW-NYLON SHEET ATT.
2722 BEARING-ROLLER
2772 PIN-ROLLER
2777 SPACER-CENTER
2776 SPACER-OUTER
2753 CIRCLIP-RETAINER PIN
2325 PLATE ASY-MAIN SCREW DRIVE—FIG. 5
2524 PLATE-BALL NUT MOUNT 2301 SCREW-MAIN DRIVE
2302 NUT-MAIN SCREW DRIVE
2303 SCREW-SET MAIN SCREW
2654 PIN-DOWEL ROLLER
2622 BEARING-ROLLER
2406 NUT-PLATE STOP
2400 MOTOR/PLATE/GEAR ASY-DRIVE—FIG. 7
2413 MOTOR ASY-DRIVE
2475 GEAR-PINION MOTOR MOUNT
2408 PLATE-MOTOR MOUNT
2410 SCREW-MOTOR/PLATE ATT.
2412 SCREW-SET GEAR ATT
2401 GEAR BOX/TUBE/DRIVE ASY—FIG. 6
2514 GEAR WHEEL TRANSMISSION
2520 HOUSING-GEAR BOX
2521 SCREW-GEAR BOX ATT.
2517 BEARING-NEEDLE
2773 CAP-BEARING STOP
2526 inner tube/drive plate assy
2474 PLATE ASY-GEAR SHAFT MOUNT—FIG. 8
2471 PLATE-TUBE OUTER
2245 PIN-DOWEL GEAR SHAFT
2522 BEARING-TRUST
2573 SWITCH-LIMIT (UP STOP)
2472 SCREW-SWITCH ATT.
2500 GEAR/PLATE ASY-MAIN DRIVE SHAFT—FIG. 9
2474 PLATE ASY-GEAR SHAFT MOUNT
2325 PLATE ASY-MAIN SCREW DRIVE
2470 GEAR-WHEEL
2518 PIN-DOWEL GEAR LOCK
2526 INNER/TUBE DRIVE PLATE ASY—FIG. 10
2675 TUBE ASY-INNER (FINAL)
2677 SCREW-GEAR/PLA/TUBE ATT
2600 TUBE ASY-INNER (WELD)—FIG. 11
2625 TUBE-INNER
2626 PLATE-INNER SUPPORT
2627 PLATE-OUTER SUPPORT
2634 TUBE ASY-REAR REINF (WELD)
2634 tube assembly-rear reinforcement (welded)—FIG. 12
2635 TUBE-REAR REINFORCEMENT
2636 NUT-WELD BRACE SUPPORT ATT
2675 TUBE ASY-INNER (FINAL)—FIG. 13
2600 TUBE ASY-INNER (WELD)
2632 SOCKET-TAILGATE PIVOT RH
2649 SOCKET-TAILGATE PIVOT LH
2549 BUMPER & SCREW ASY-ALIGNMENT
2679 PLUG RC COVER-REAR REINF
2647 SCRIBET & SCREW ASY-CABLE ATT
2860 NUT-SOCKET ATTACHMENT
2700 TUBE ASY-OUTER (FINAL)—FIG. 14
2268 LATCH-UPPER LOCK
2269 SCREW-LATCH ATT
2648 BUMPER OVERSLAM/SCREW
2828 STRICKER ASY
2272 NUT-STRICKER ATT
2751 J-NUT-FLOOR ATT
2701 TUBE ASY-OUTER (WELD)
2701 TUBE ASY-OUTER (WELD)—FIG. 15
2738 TUBE-OUTER
2272 PANEL ASY-SIDE COLLAR ATT
2242 BRACKET-FLOOR SUPPORT
2771 BRACKET-STRICKER SUPPORT
2733 PANEL ASY-SIDE (WELD)—FIG. 16
2740 PANEL-SIDE
2741 REINF-SIDE PANEL
2270 NUT-WELD M-10×1.5

Overview

Figure 17:
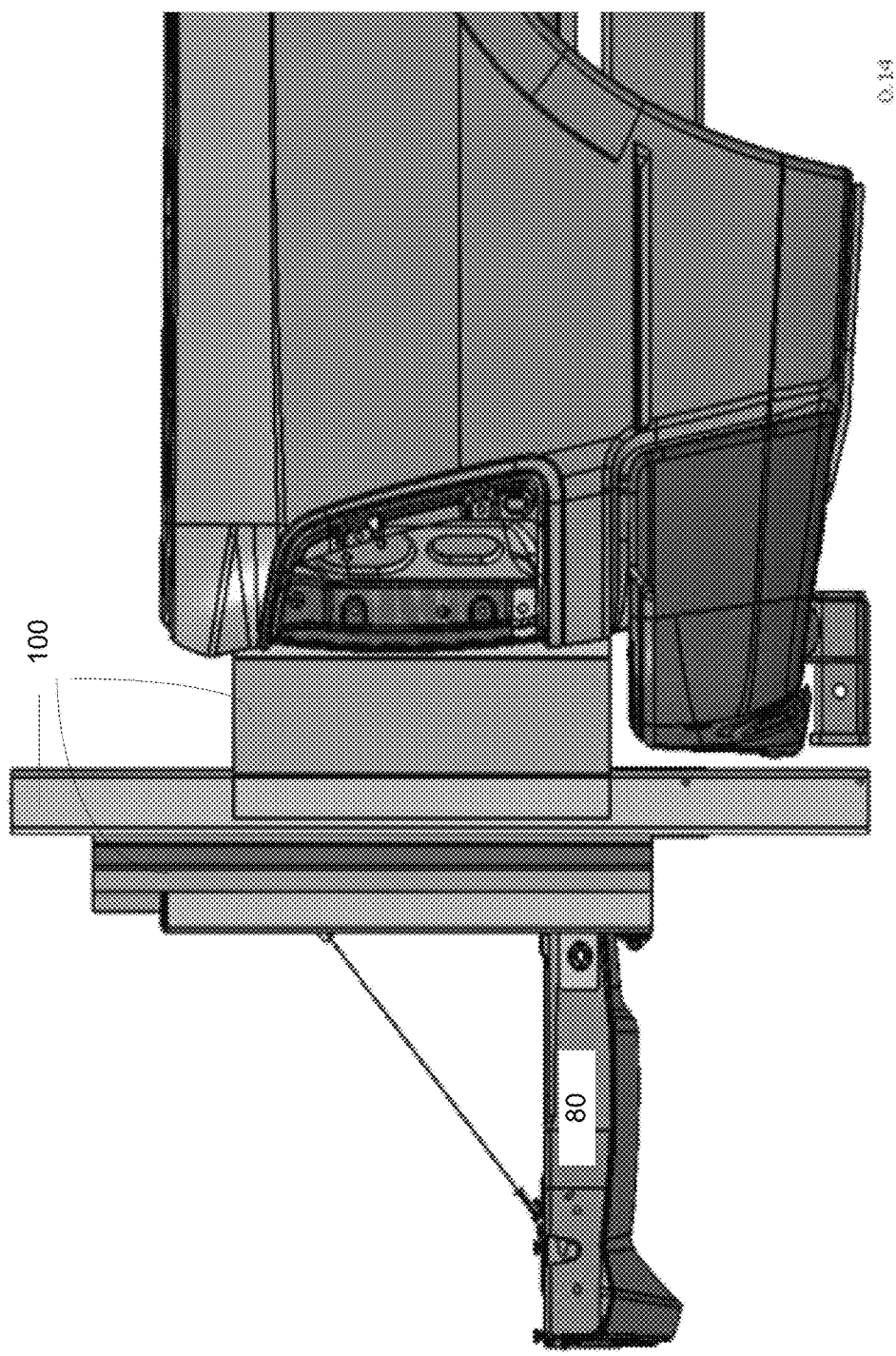
FIG. 17 is a side view of an EPLM device with a tailgate in a raised position.
Figure 18:
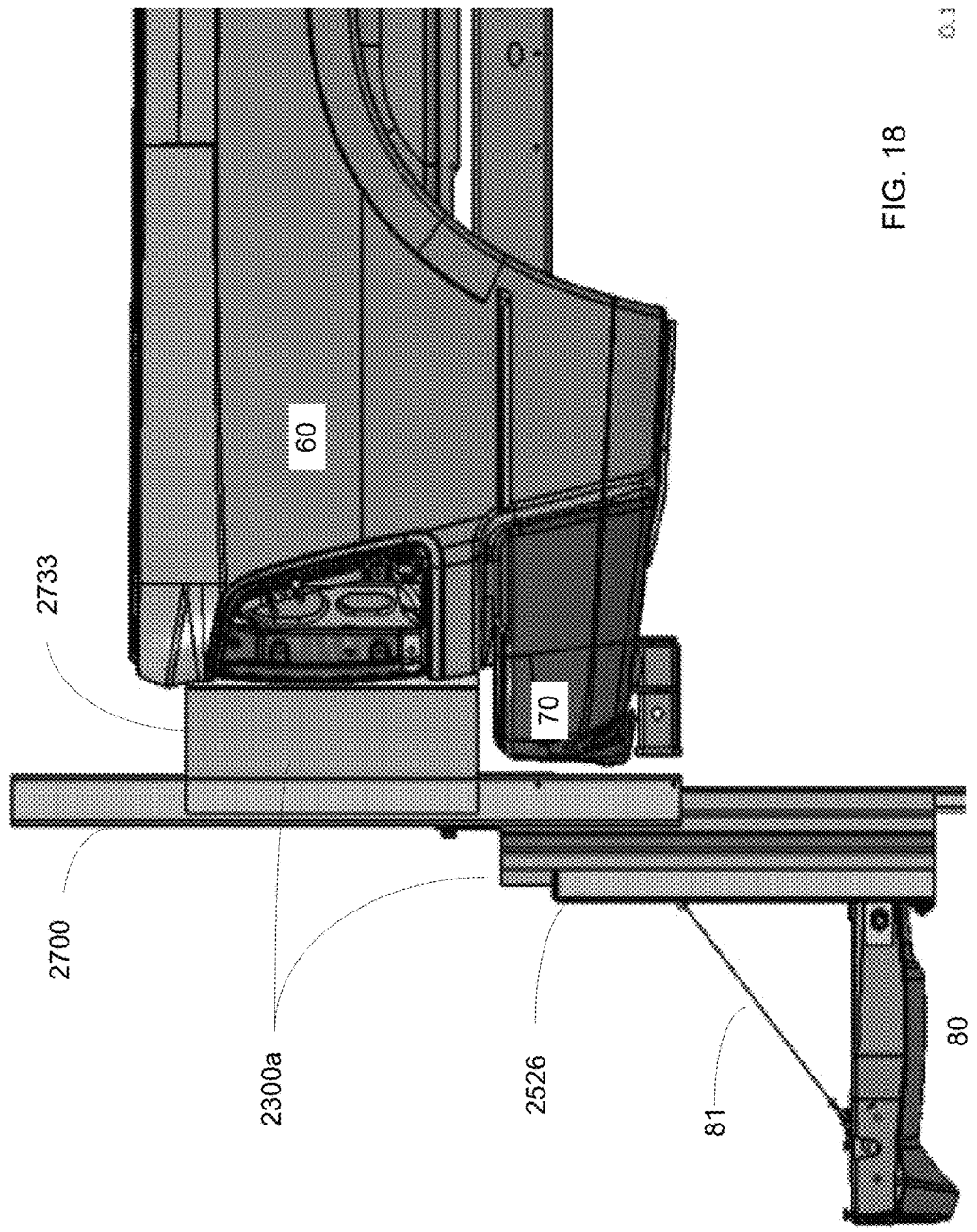
FIG. 18 is a side view of an EPLM device with a tailgate in a lowered position.
Figure 19:
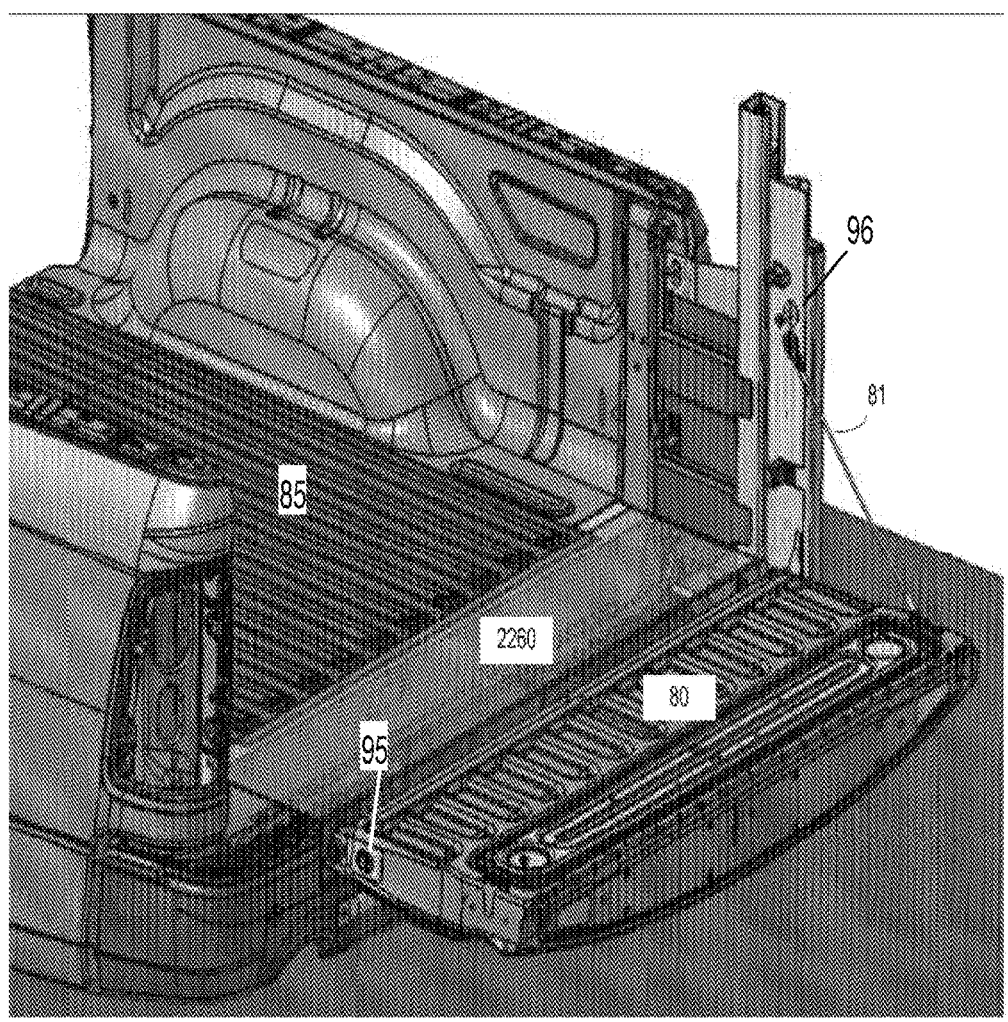
FIG. 19 is a rear perspective view of a right side assembly of an EPLM device with a tailgate in a raised position.
Figure 20:
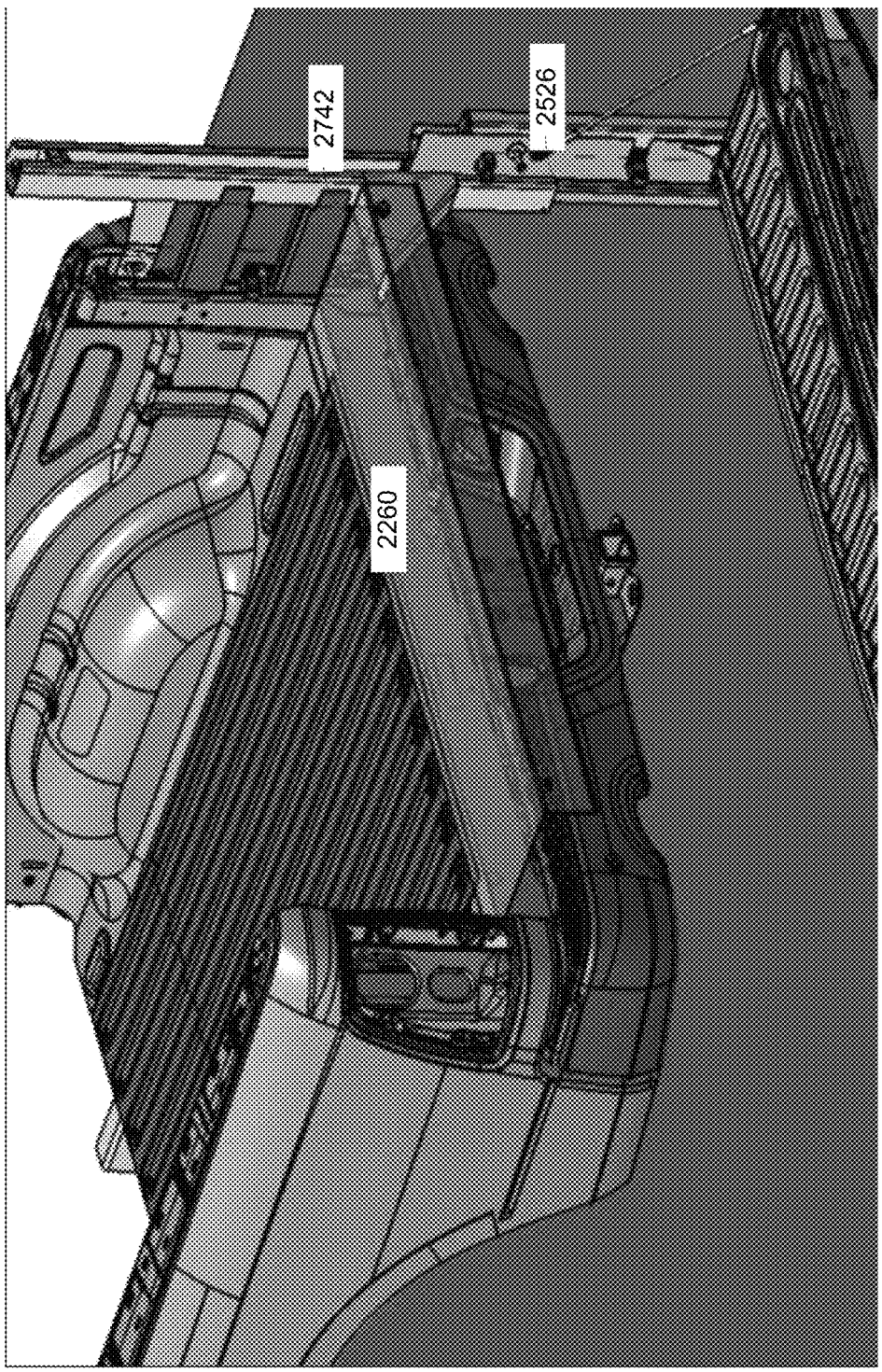
FIG. 20 is a rear perspective view of a right side assembly of an EPLM device with a tailgate in a lowered position.
Figure 21:
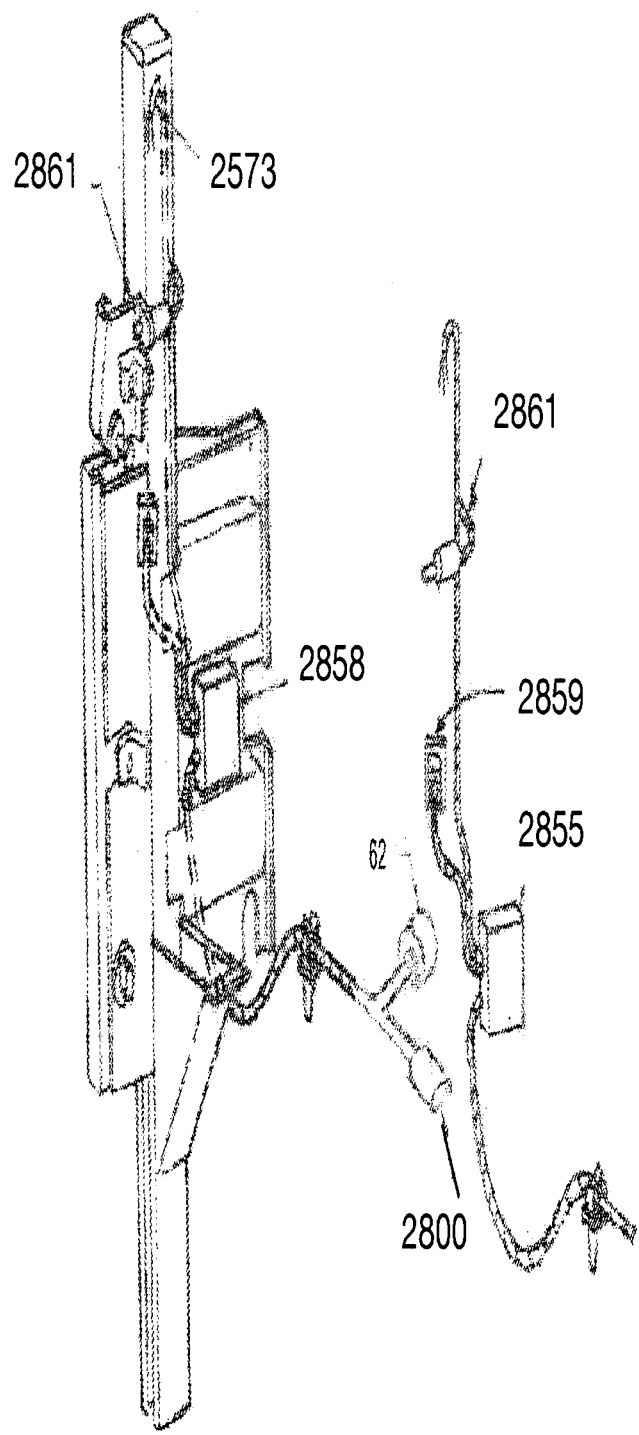
FIG. 21 is a schematic of the left side wire harness assembly.

FIG. 18 is a side view of an EPLM device 100 with a tailgate in a lowered position. FIG. 17 is a side view of an EPLM device with a tailgate in a raised position. FIG. 20 is a rear perspective view of a right side assembly of an EPLM device with a tailgate in a lowered position. FIG. 19 is a rear perspective view of a right side assembly of an EPLM device with a tailgate in a raised position. In this example, an EPLM device 100 is attached to the rear portion of a pickup truck 60. The EPLM device has a right side inner/outer tube assembly 2300*a*, a left side inner/outer tube assembly, and a floor panel 2260. In this embodiment, electric motors are provided in each side assembly, and the motors raise and lower an inner tube/drive plate assembly 2526. The vehicle tailgate is attached to the drive plate assembly so that the tailgate, and a load place on the tailgate, is raised or lowered as the drive plate assembly is raised and lowered.

Each side inner/outer tube assembly includes an side panel assembly 2733 which extends the inner/outer tube assembly past the bumper, and permits the lifting elements and tailgate to move without obstruction from the rear bumper 70. The EPLM device raises or lowers the tailgate 80.

The vehicle tailgate attaches to the side assemblies in the same manner that it attaches to the truck. In this embodiment, the EPLM device is operated from the vehicles electric system, and the electrical connections are made at a single connector provided by the vehicles rear bumper or hitch. The side assemblies are easily removed, so that the truck may be operated in either its standard configuration or with the EPLM device installed.

Figure 1:
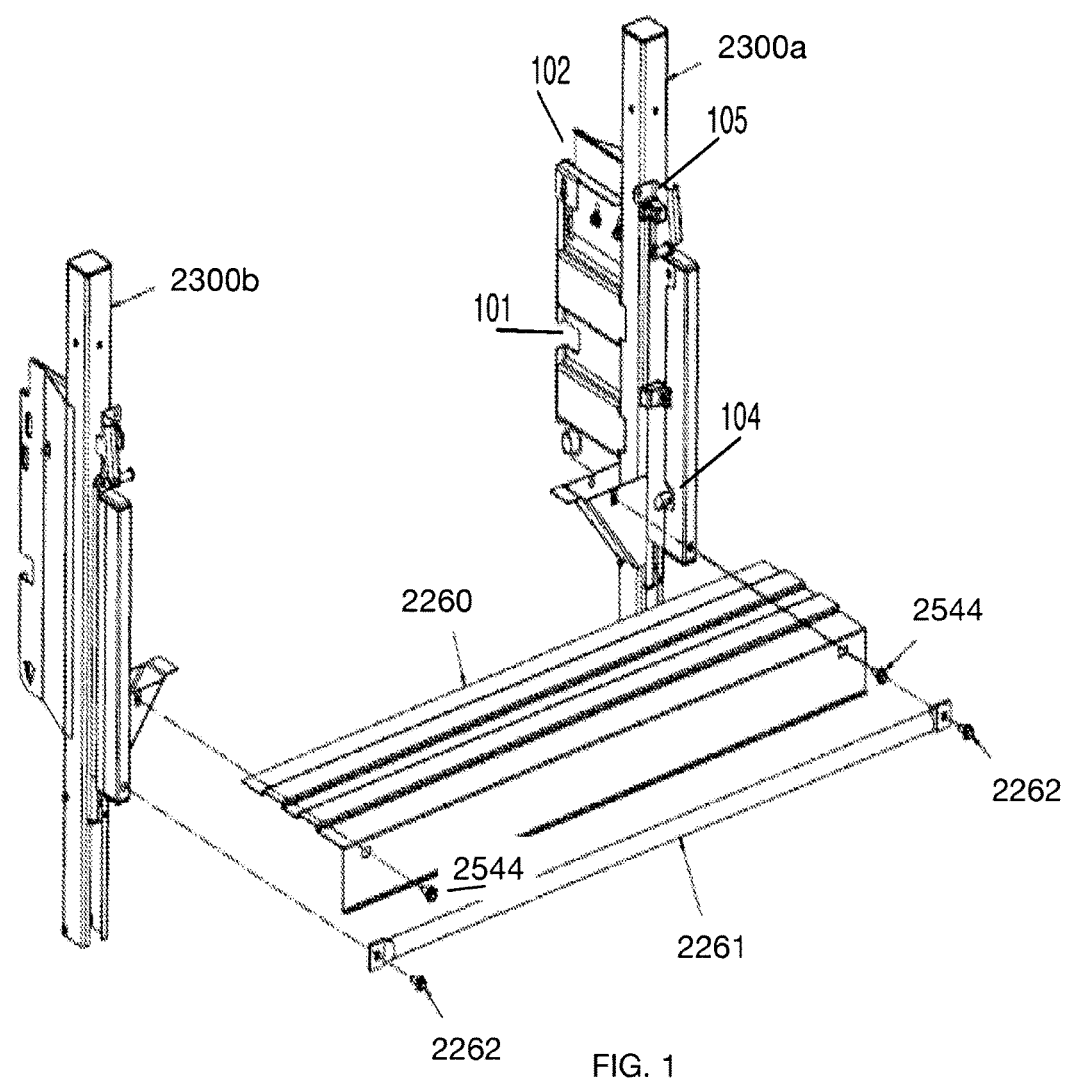

FIG. 1 is an exploded side perspective view of a right side inner/outer tube assembly 2300*a*; a left side inner/outer tube assembly; and a floor panel 2260.

Side Assembly and Tailgate Mounting

The side assemblies are mounted over the existing tailgate pivot 95 and upper cable anchor pin 96 so that the side assembly pivot mounting notch 101 in the side panel assembly 2733 is positioned over the tailgate pivot, and the side assembly striker mounting slot 102 is mounted over the cable anchor pin.

A new tailgate pivot 104 and new tailgate striker 105 are provided on the inner tube drive plate assembly 2526 so that the tailgate may be opened and closed with respect to the side assemblies in the same manner that it is opened and closed with respect to the cargo box.

As shown in FIG. 1, the floor panel 2260 and brace 2261 may be quickly installed with four screws 2262 and 2544. When installed, the floor panel acts to secure the side assemblies in a mounted position over the tailgate pivot and upper cable anchor pin.

Figures 3A, 3B:
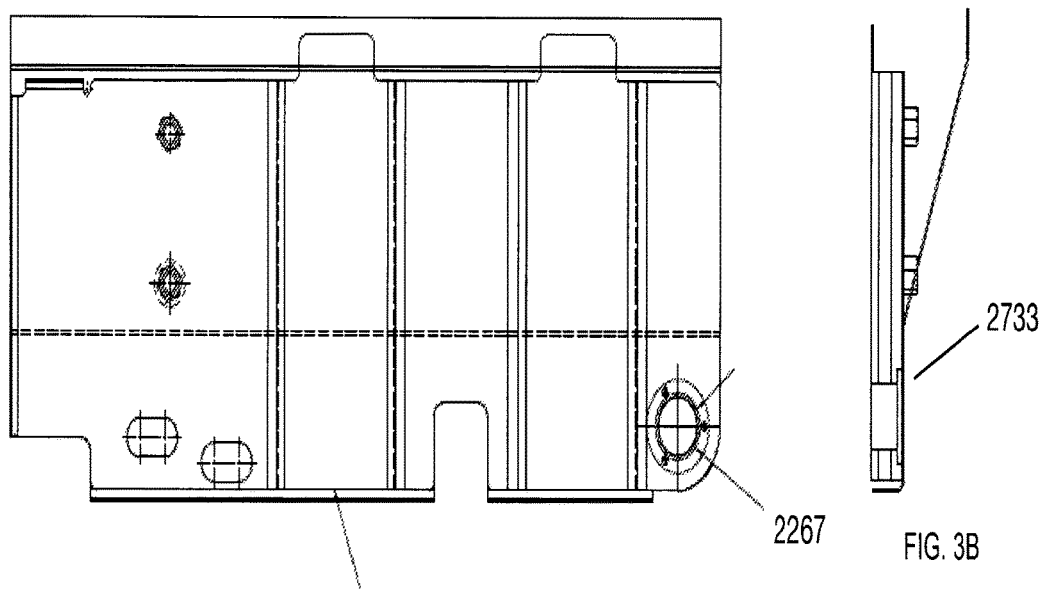
FIG. 3A is is a side view of a side panel assembly of the tailgate lift device of FIG. 1.
FIG. 3B is a front view of the side panel assembly of FIG. 3A.
Figure 3C:
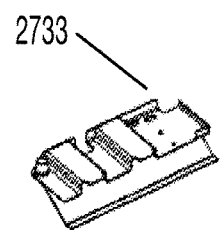
FIG. 3C is an isometric view of the side panel assembly of FIG. 3A.

FIG. 3A is a side view of a side panel assembly 2733. FIG. 3B is a front view of the side panel assembly. FIG. 3C is an isometric view of the side panel assembly.

FIG. 11A is a side view of an inner tube and lift plate assembly 2600. In this example, welded components of the inner tube and lift plate assembly comprise an inner tube 2625, an inner plate support 2626, an outer plate support 2627, and a tube-rear reinforcement 2635. FIG. 11B is a front view of the inner tube assembly of the embodiment of FIG. 11A. FIG. 11C is an isometric view of the inner tube assembly of the embodiment of FIG. 11A.

Figure 4:
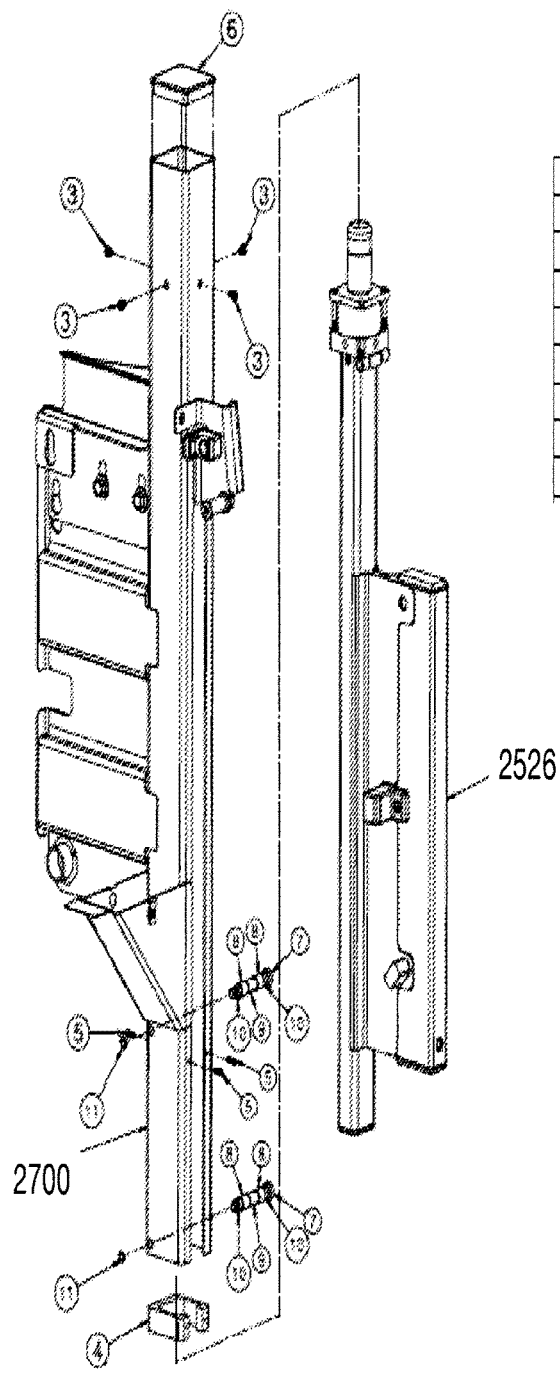

FIG. 4 is an exploded side perspective view of a right side inner tube drive plate assembly 2526 and the outer tube 2700. In this example, the inner tube drive plate assembly 2526 comprises a nylon sheet 2633 with attachment screw 2523; an outer tube closure cap 2467; a roller bearing 2722; a roller pin 2772; center spacer 2777; outer spacer 2776; and retainer pin 2753.

FIG. 14A is a side view of the outer tube assembly 2700 of the embodiment of FIG. 1. FIG. 14B is a top view of the outer tube assembly of the embodiment of FIG. 14A. FIG. 14C is a front view of the outer tube assembly of the embodiment of FIG. 14A. FIG. 14D is an isometric view of the outer tube assembly of the embodiment of FIG. 14A.

FIG. 15A is a side view of the outer tube 2738 assembly and floor support bracket 2742 of the embodiment of FIG. 1. FIG. 15B is a top view of the outer tube assembly and floor support bracket of the embodiment of FIG. 15A. FIG. 15C is a front view of the outer tube assembly and floor support bracket of the embodiment of FIG. 15A. FIG. 15D is an isometric view of the outer tube assembly and floor support bracket of the embodiment of FIG. 15A.

Motor and Gear Assembly

Figure 22:
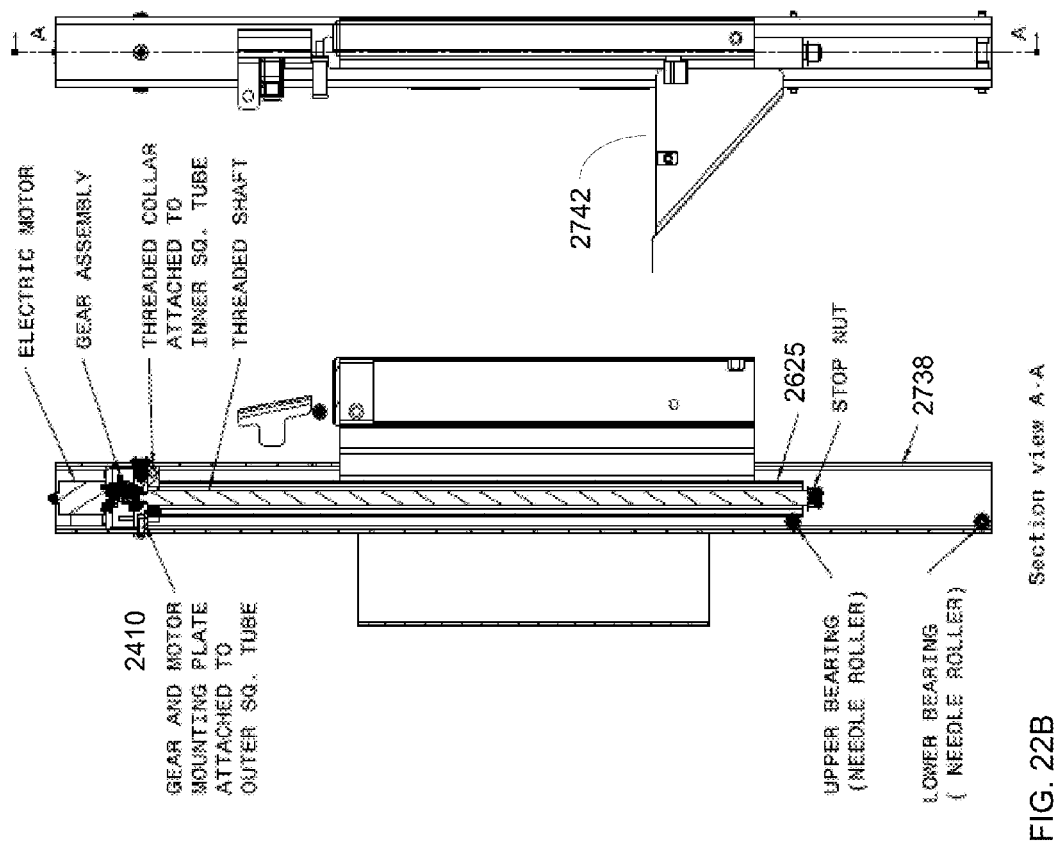
FIG. 22A is rear view of the right side assembly of FIG. 16 with a motor and gear assembly.
FIG. 22B is cross section view of the right side assembly of FIG. 16 with a motor and gear assembly.
Figure 23:
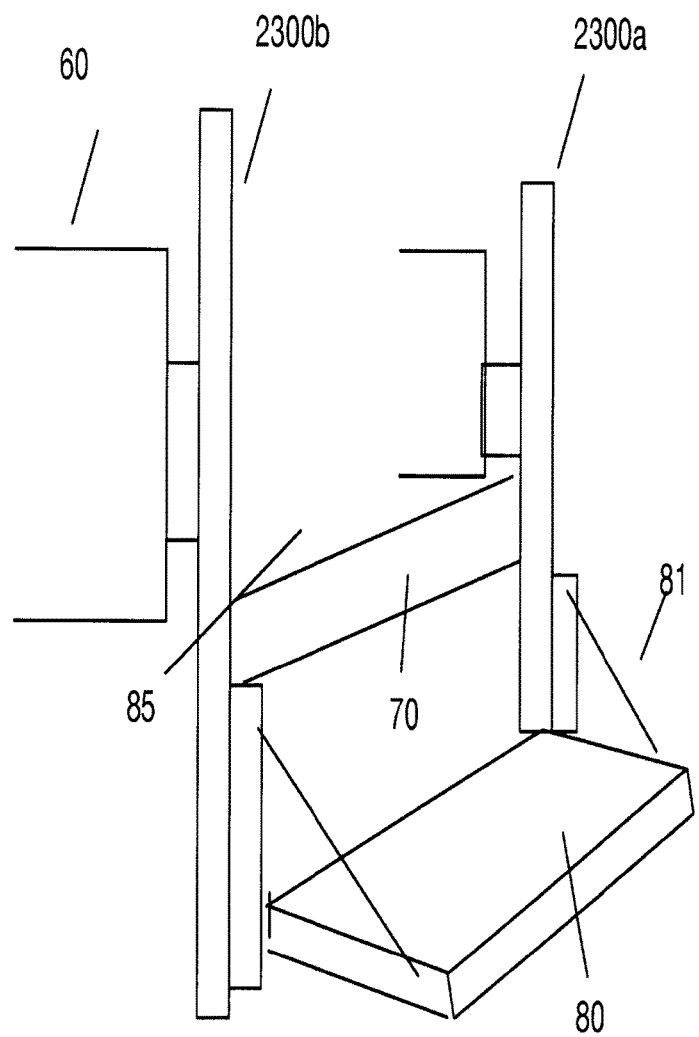
FIG. 23 is a rear perspective view of an EPLM device with a tailgate in a lowered position.

FIG. 22A is rear view of the right side assembly of FIG. 19 with a motor and gear assembly.

FIG. 22B is cross section view of the right side assembly of FIG. 16 with a motor and gear assembly which shows the outer tube 2738, the inner tube 2625, with the motor mounted with respect to the outer tube.

A gear and motor mounting plate 2410 supports an electric motor and a gear assembly. The electric motor and gears turn a threaded shaft which raises and lowers the inner tube and tailgate support with respect to the inner tube.

Figure 6:
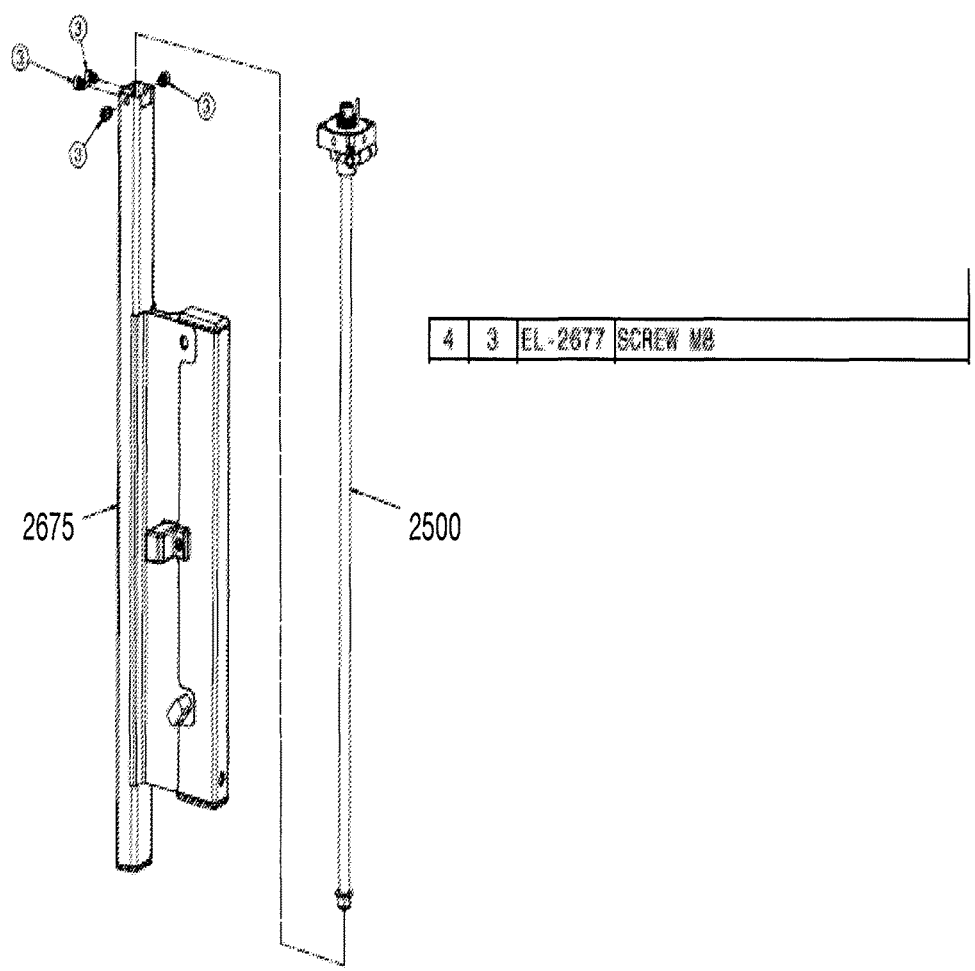
Figure 7:
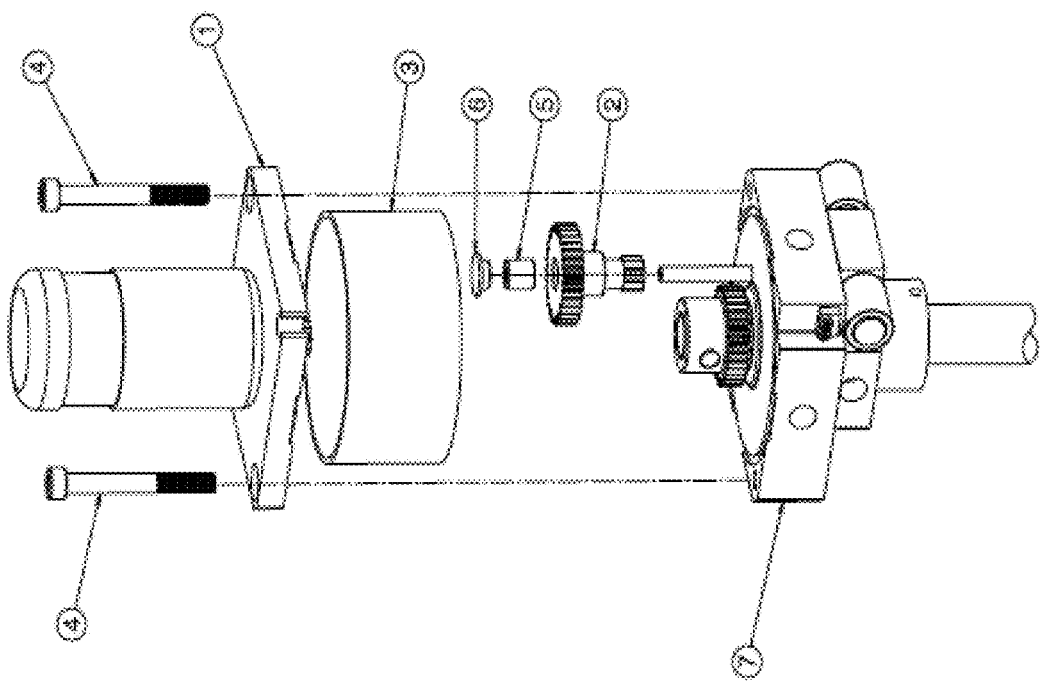

FIG. 6 is an exploded view of a motor/plate/gear drive assembly 2400 of the embodiment of FIG. 1. FIG. 7 is an exploded view of the plate and gear assembly 2325 of FIG. 6. The motor/plate/gear assembly drive 2400 comprise a drive motor assembly 2413, a gear-pinion motor mount, and a motor mount plate 2408. The gear box/tube/drive assembly 2401 comprises a gear wheel transmission 2514, a gear box housing 2520, a gear box attachment screw, a needle bearing 2517, and a bearing stop cap 2773. The gear plate assembly 2500 of the main drive shaft 2500 includes a gear shaft mount plate assembly 2474, a main screw drive plate assembly, a wheel gear 2470 and a dowel gear lock.

Figure 5:
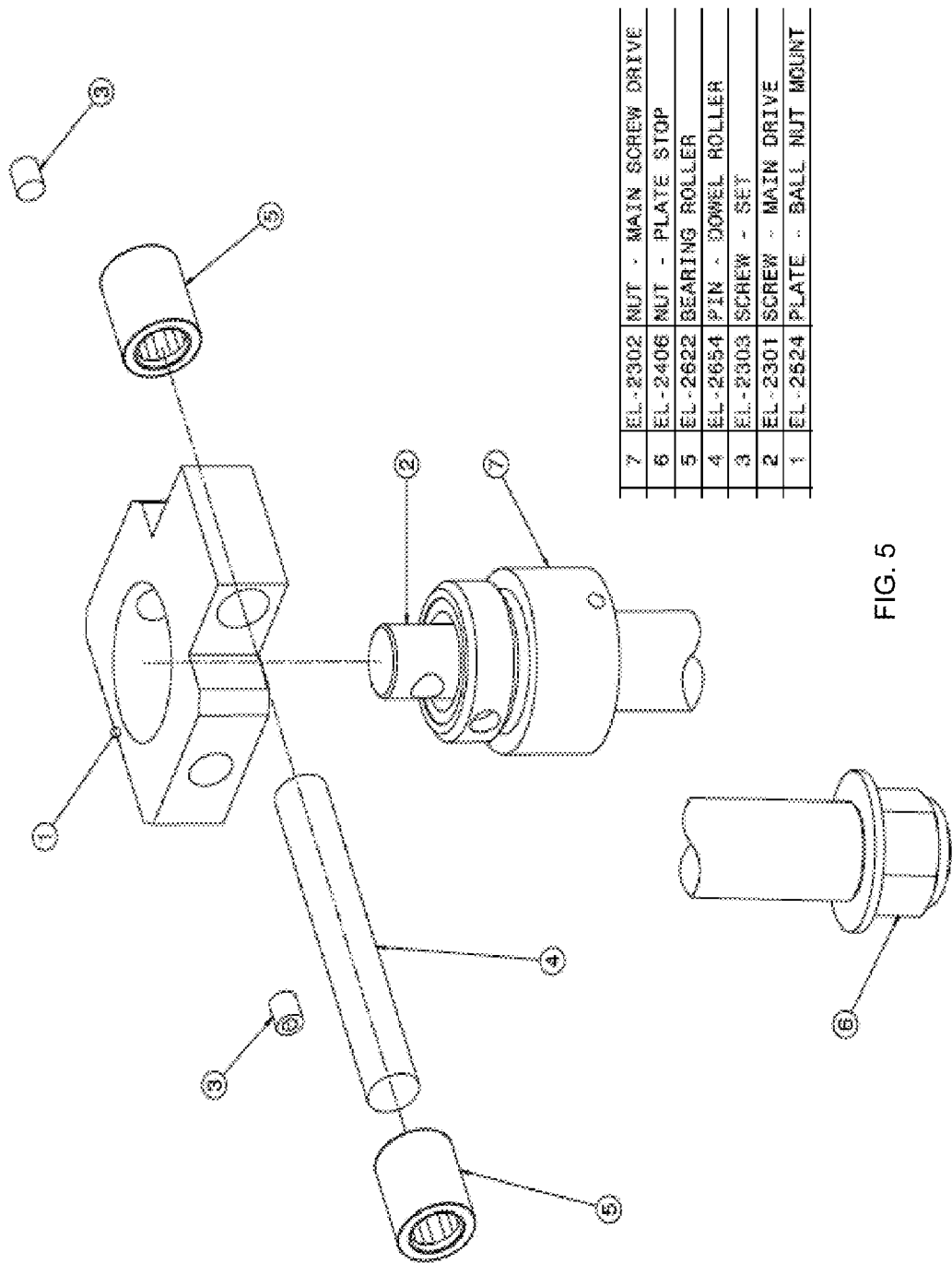

FIG. 5 is an exploded view of a top portion of the main screw drive plate assembly 2325 which comprises a ball nut mount plate 2524, a main drive screw 2301 with main screw drive nut 2302 and set screw 2303, a dowel roller pin 2654, a roller bearing 2622, and a stop plate nut 2406.

Electrical Components

Figure 2:
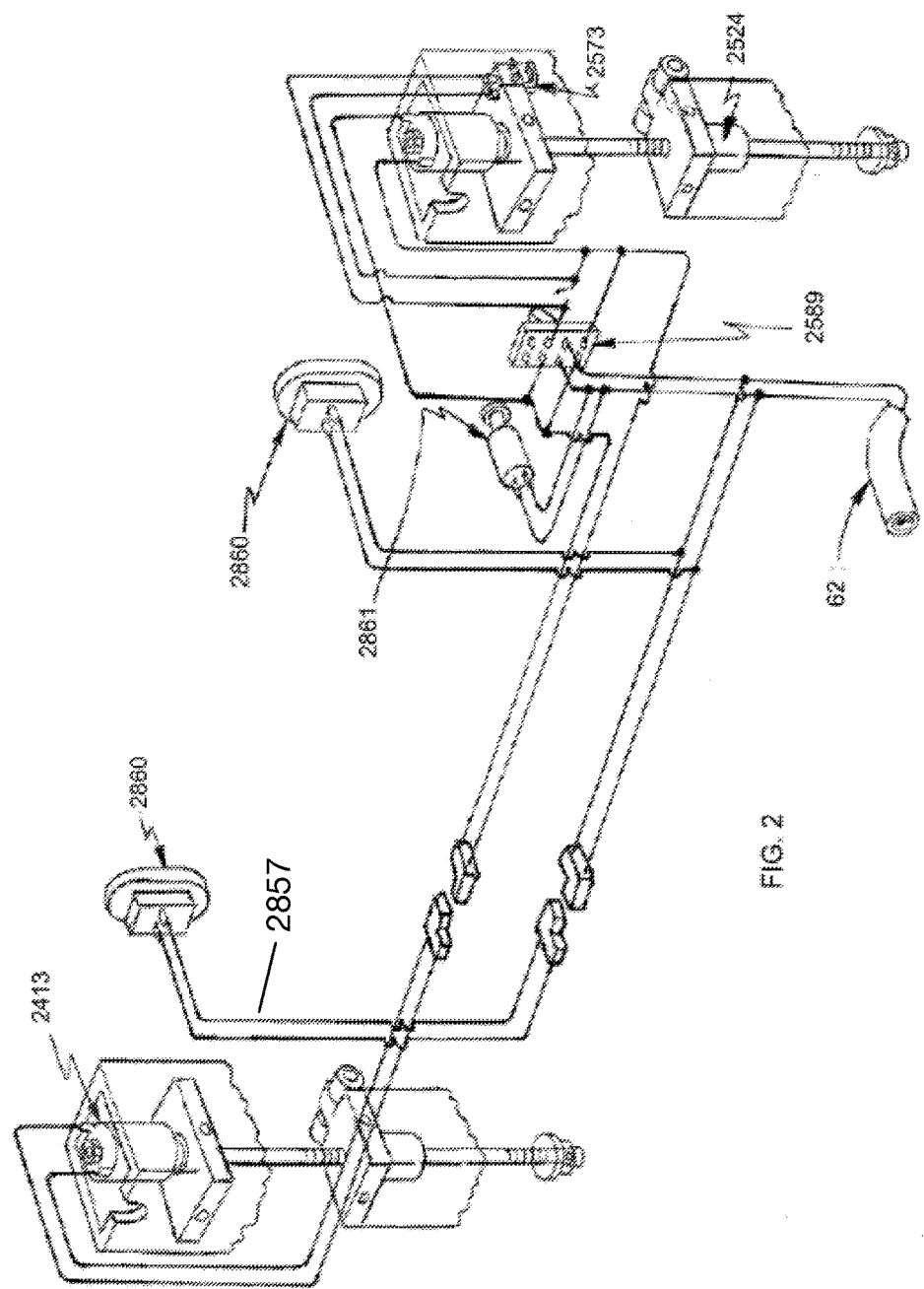

FIG. 2 is an electrical schematic 2000 of one embodiment of the current invention.

The following review is a functional description of electrical components and wire harnesses and how they are utilized, installed, attached and harness connected into the example tailgate assembly.

Switch-Limit Up-Stop 2573:

This switch is used to shut down the electrical system when the tailgate reaches the up horizontal load position. The switches, two required, are connected via the left/right wire harnesses to the PCB unit and pre-assembled. (See Plate assembly-Gear Shaft Mount 2474 for attachment.)

Switch-Up/Down Control 2474:

This switch controls the up and down tailgate load movement by an operator. When the tailgate reaches the up position, the system is automatically stopped as noted above and the switch reverts to the off position. The operator controls the down movement to a desired load level. A lower stop mechanism attached to the drive screw shaft 2325 is controls the lowest tailgate position. If this occurs the operator shuts down the system. The Switch, one required, is located on the outer side of the left side assembly 2701 and is pre-assembled to the left side harness assembly to communicate to the PCB unit. No remote control is required.

Switch-Tailgate Horizontal Load Position 2861:

This plunger switch or optical proximity switch indicates to the PCB unit that the tailgate is in the horizontal load open position prior to operating the tailgate downward movement. If the tailgate is in the upper closed lock position, the system will not function. The switch, one required, is pre-assembled to the left side harness assembly and nut attached to the left side tube assembly striker bracket 2771.

Tail Light-LED Stop/Turn/Tail Light 2860:

The light assembly wire attachment is not included in the wire harness assembles. The lighting system wire is attached to the wire harness as shown in attached sketch. A separate wire is required in the left and right wire harnesses to provide its connection to the vehicle's 12-voltage electrical system. The lighting system is independent of the PCB control system. This wire connect is similar to the current trailer vehicle connection. The final light assembly screw attachment to the outer tube is as shown 2000.

PCB Control Unit 2858:

The PCB Unit is utilized to monitor/control an Igarashi Motor/Encoder (Sensor) Assembly 2413 sequence parallel movement of the tailgate. The PCB unit is also monitors the three (3) switch functions as noted above. The unit, one required, shall require a self contained cover which shall be located in the space provided in the inner side of the left side tailgate assembly. The PCB unit is typically included in the lift side wire harness assembly.

Harness Asy-RH 2800:

The limit switch, motor/encoder and LED tail light are socket attached during harness installation process. The harness assembly lower floor attachment is fastened by a series of Xmas clips. The harness is socket connected to the left side harness assembly and attached to the floor pan during the customer installation of the tailgate lift assembly.

Harness Asy-LH 2857:

The left side harness assembly comprise the above components where noted with the motor, limit switch and LED tail light connected in the same manner as the right side. The lower attachment is the same as the right side with a socket connect to the right side harness. A socket lead from the harness to the vehicle's 12-volt trailer hitch system is required. Example limit switches include mechanical limit switches and electronic limit switches.

Installation

In one example, the end customer receives the Tailgate assembly in three (3) containers, one for each side assembly and one for the floor pan with fasteners. The customer installs the tailgate assemblies as follows. No modification to the truck cargo box 85 is required:

Inspect if all components are enclosed in the boxes and read the installation instructions.
  Disconnect the two (2) tailgate cables from the cargo box and remove the tailgate. No tools are required.
  Insert each side assembly's lower collar into the cargo box tailgate pivot pins and pivot to the vertical position at the cargo box striker pins. Secure the lock latch 2268 to the striker pins via two (2) nuts 2272 on each side.
  Install the floor pan and secure to the lower support bracket 2261 via two (2) screws 2544.
  Connect the right side wire harness assembly to the left side wire harness assembly and secure to the floor pan clips.
  Insert the total wire harness assembly to the truck trailer electrical receptacle for the systems 12-volt system.

Install the tailgate to the side assemblies, attach the cables on each side and check closed lock and open load positions.

Inspect the lift system's operational performance prior to usage.

Disengage the tailgate support cables from the top end and remove the tailgate.

Install each side assembly by first inserting the lower side assembly collar system into the truck cargo box tailgate pivot pin and pivot into the vertical position until the side assembly contacts the cargo.

Figure 12C:
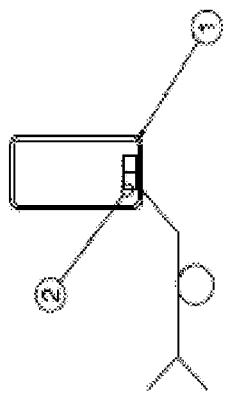
FIG. 12C is a side perspective view of the tube assembly of the tailgate lift device of FIG. 12A.
Figure 12B:
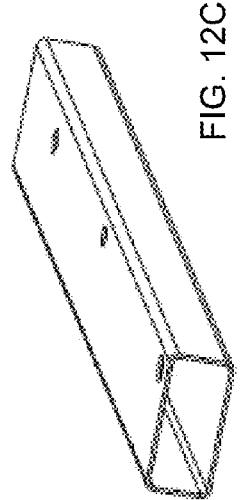
FIG. 12B is a top view of the tube assembly of the tailgate lift device of FIG. 12A.
Figure 12A:
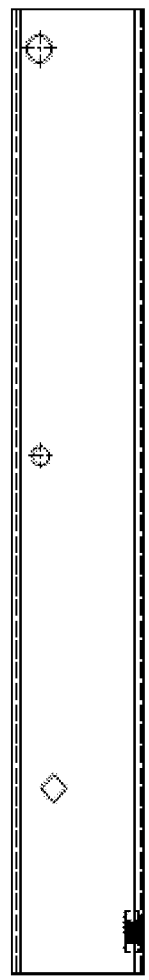
FIG. 12A is a side view of the tube assembly of the tailgate lift device of FIG. 1.

FIG. 12 is a rear perspective view of an EPLM device 100 with a tailgate 80 in a lowered position. (This is a test device which includes a testing support stand).

It is to be understood that the specific embodiments and examples described above are by way of illustration, and not limitation. Various modifications may be made by one of ordinary skill, and the scope of the invention is as defined in the appended claims.

What is claimed is:

1. An electric powered tailgate lift apparatus for a vehicle, the vehicle comprising a pickup, the pickup comprising, a first side tailgate pivot pin, a second side tailgate pivot pin, a cargo box having a rear end, and a rear bumper, the tailgate lift apparatus comprising
   a vehicle tailgate;
   a first side assembly
      comprising a first
      electric motor,
      a first drive plate assembly,
      a first side panel assembly, configured to be mounted to the pickup first side tailgate pivot pin, and configured to extend the first drive plate assembly past the pickup bumper,
      a first side assembly pivot pin configured to permit the vehicle tailgate to be pivoted relative to the first side assembly pivot pin, and
      a first side assembly striker, configured to permit the vehicle tailgate to be latched in a vertical closed orientation;
   a second side assembly comprising
      a second drive plate assembly, and
      a second side panel assembly, configured to be mounted to the pickup second side tailgate pivot pin, and configured to extend the second drive plate assembly past the bumper,
      a second side assembly pivot pin configured to permit the vehicle tailgate to be pivoted relative to the second side assembly pivot pin, and
      a second side assembly striker, configured to permit the vehicle tailgate to be latched in a vertical closed orientation;
   a floor panel configured to extend rearward from the rear end of the vehicle cargo box;
   wherein the vehicle tailgate is configured to be pivotally attached to the first and second side tailgate pivot pins when the lift apparatus is not installed on the vehicle and to the first and second side assembly pivot pins when the lift apparatus is installed on the vehicle, and
   wherein the first and second side assemblies are configured to move the vehicle tailgate in a substantially linear vertical direction.

2. The electric powered tailgate lift apparatus of claim 1 wherein
   the second side panel assembly further comprises a second electric motor.

3. The electric powered tailgate lift apparatus of claim 1 further comprising
   a first gear and motor mounting plate, such that the gear and motor mounting plate supports the first electric motor and a first gear assembly; and
   a first threaded shaft which raises and lowers a tailgate support with respect to the first side panel assembly.

4. The electric powered tailgate lift apparatus of claim 1 wherein the first gear assembly further comprises
   a drive motor assembly comprising the first electric motor;
   a gear-pinion motor mount;
   a motor mount plate;
   a gear shaft mount plate assembly;
   a main screw drive plate assembly;
   and a wheel gear.

5. The electric powered tailgate lift apparatus of claim 1 wherein the first drive plate assembly further comprises
   a gear wheel transmission,
   and a gear box housing.

6. The electric powered tailgate lift apparatus of claim 1 further comprising a first side harness assembly comprising
   a limit switch,
   an encoder, and
   an LED tail light socket.

7. The electric powered tailgate lift apparatus of claim 6 wherein the limit switch is an electronic limit switch.

8. The electric powered tailgate lift apparatus of claim 6 further comprising a second side harness assembly comprising
   a limit switch,
   an encoder, and
   an LED tail light socket.

9. The electric powered tailgate lift apparatus of claim 1 further comprising an up-stop limit switch;
   an up/down control switch; and
   an optical proximity switch indicating that the tailgate is in the horizontal load open position prior to operating the tailgate downward movement.

10. The electric powered tailgate lift apparatus of claim 1 further comprising
    an up-stop limit switch;
    an up/down control switch; and
    a plunger switch indicating that the tailgate is in the horizontal load open position prior to operating the tailgate downward movement.

* * * * *